US005706647A

United States Patent [19]

Frey et al.

[11] Patent Number: 5,706,647

[45] Date of Patent: Jan. 13, 1998

[54] AIRFOIL STRUCTURE

[75] Inventors: Gary A. Frey, Poway; Christopher Z. Twardochleb, Alpine, both of Calif.

[73] Assignee: Solar Turbines Incorporated, San Diego, Calif.

[21] Appl. No.: 339,527

[22] Filed: Nov. 15, 1994

[51] Int. Cl.[6] ........ F02C 3/00

[52] U.S. Cl. ........ 60/39.75; 415/209.3; 415/209.4

[58] Field of Search ........ 60/39.37, 39.75, 60/753; 415/209.3, 209.4

[56] References Cited

U.S. PATENT DOCUMENTS

| | | | |
|---|---|---|---|
| 2,110,679 | 3/1938 | Robinson . | |
| 4,643,636 | 2/1987 | Libertini et al. | 415/209.4 |
| 5,380,154 | 1/1995 | Norton et al. | 415/209.3 |
| 5,394,687 | 3/1995 | Chen et al. | 60/39.75 |

FOREIGN PATENT DOCUMENTS

| | | | |
|---|---|---|---|
| 0466602 | 12/1991 | France . | |
| 759514 | 4/1953 | Germany . | |
| 344800 | 4/1950 | Switzerland . | |
| 478104 | 1/1938 | United Kingdom | 415/209.4 |
| 712589 | 2/1951 | United Kingdom . | |
| 2129882 | 5/1984 | United Kingdom . | |
| 2236809 | 4/1991 | United Kingdom . | |

*Primary Examiner*—Charles G. Freay
*Attorney, Agent, or Firm*—Larry G. Cain

[57] ABSTRACT

Past airfoil configurations have been used to improve aerodynamic performance and engine efficiencies. The present airfoil configuration further increases component life and reduces maintenance by reducing internal stress within the airfoil itself. The airfoil includes a chord and a span. Each of the chord and the span has a bow being summed to form a generally "C" configuration of the airfoil. The generally "C" configuration includes a compound bow in which internal stresses resulting from a thermal temperature gradient are reduced. The structural configuration reduces internal stresses resulting from thermal expansion.

12 Claims, 5 Drawing Sheets

10
12
14
16
18
28
30
32
34
36
2

AIRFOIL STRUCTURE

The Government of the United States of America has rights in this invention pursuant to Contract No. DE-AC21-93MC30246 awarded by the U.S. Department of Energy.

TECHNICAL FIELD

This invention relates generally to gas turbine engine components and more particularly to the structural design of airfoils such as turbine blades and nozzles.

BACKGROUND ART

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a turbine, delivering up some of its energy to drive the turbine and produce mechanical power.

In order to produce a driving torque, the axial turbine consists of one or more stages, each employing one row of stationary nozzle guide vanes and one row of moving blades mounted on a turbine disc. The nozzle guide vanes are aerodynamically designed to direct incoming gas from the combustion stage onto the turbine blades and thereby transfer kinetic energy to the blades.

The gases typically entering the turbine have an entry temperature from 850 to 1200 degrees Celsius. Since the efficiency and work output of the turbine engine are related to the entry temperature of the incoming gases, there is a trend in gas turbine engine technology to increase the gas temperature. A consequence of this is that the materials of which the blades and vanes are made assume ever-increasing importance with a view to resisting the effects of elevated temperature.

Historically, nozzle guide vanes and blades have been made of metals such as high temperature steels and, more recently, nickel alloys, and it has been found necessary to provide internal cooling passages in order to prevent melting. It has been found that ceramic coatings can enhance the heat resistance of nozzle guide vanes and blades. In specialized applications, nozzle guide vanes and blades are being made entirely of ceramic, thus, imparting resistance to even higher gas entry temperatures.

However, if the nozzle guide vanes and/or blades are made of ceramic, which have a different chemical composition, physical property and coefficient of thermal expansion to that of a metal structure, then undesirable stresses, a portion of which are thermal stresses, will be set up within the nozzle guide vanes and/or blades and between their supports when the engine is operating. Such undesirable thermal stresses cannot adequately be contained by cooling.

Furthermore, the sliding friction between the ceramic blade and the connecting structure creates a contact tensile stress on the ceramic that degrades the surface. This degradation in the surface of the ceramic occurs in a tensile stress zone of the blade root, therefore, when a surface flaw is generated in the ceramic of critical size, the airfoil will fail catastrophically.

One of the biggest challenges in designing successful ceramic components is insuring that tensile stresses within components remain low. High tensile stress can fracture ceramic components leading to catastrophic engine failures.

For example, when designing an airfoil, operating temperatures in the middle of a turbine nozzle and/or a blade airfoil are typically much higher than at the flowpath end walls. This temperature gradient often induces undesirable tensile stress in the thin trailing edge of the component airfoil.

The present invention is directed to overcome one or more of the problems as set forth above.

DISCLOSURE OF THE INVENTION

In one aspect of the present invention, an airfoil defines a chord having a preestablished chord length and a span having a preestablished radial span length, each of the chord and the span having a curvature which when summed, forms a generally "C" configuration.

In another aspect of the invention, a gas turbine engine has a compressor section, a combustor section and a turbine section. The turbine section includes a nozzle and shroud assembly being supported within the engine to a mounting structure having a preestablished rate of thermal expansion. The nozzle and shroud assembly has a preestablished rate of thermal expansion being less than that of the mounting structure and the nozzle and shroud assembly includes an inner annular ring member, an outer annular ring structure and a plurality of airfoils being positioned therebetween. The plurality of airfoils defines a chord having a preestablished chord length and a span having a preestablished span length, each of the chord and the span having a curvature which when summed, forms a generally "C" configuration.

BEST MODE FOR CARRYING OUT THE INVENTION

Figure 1:
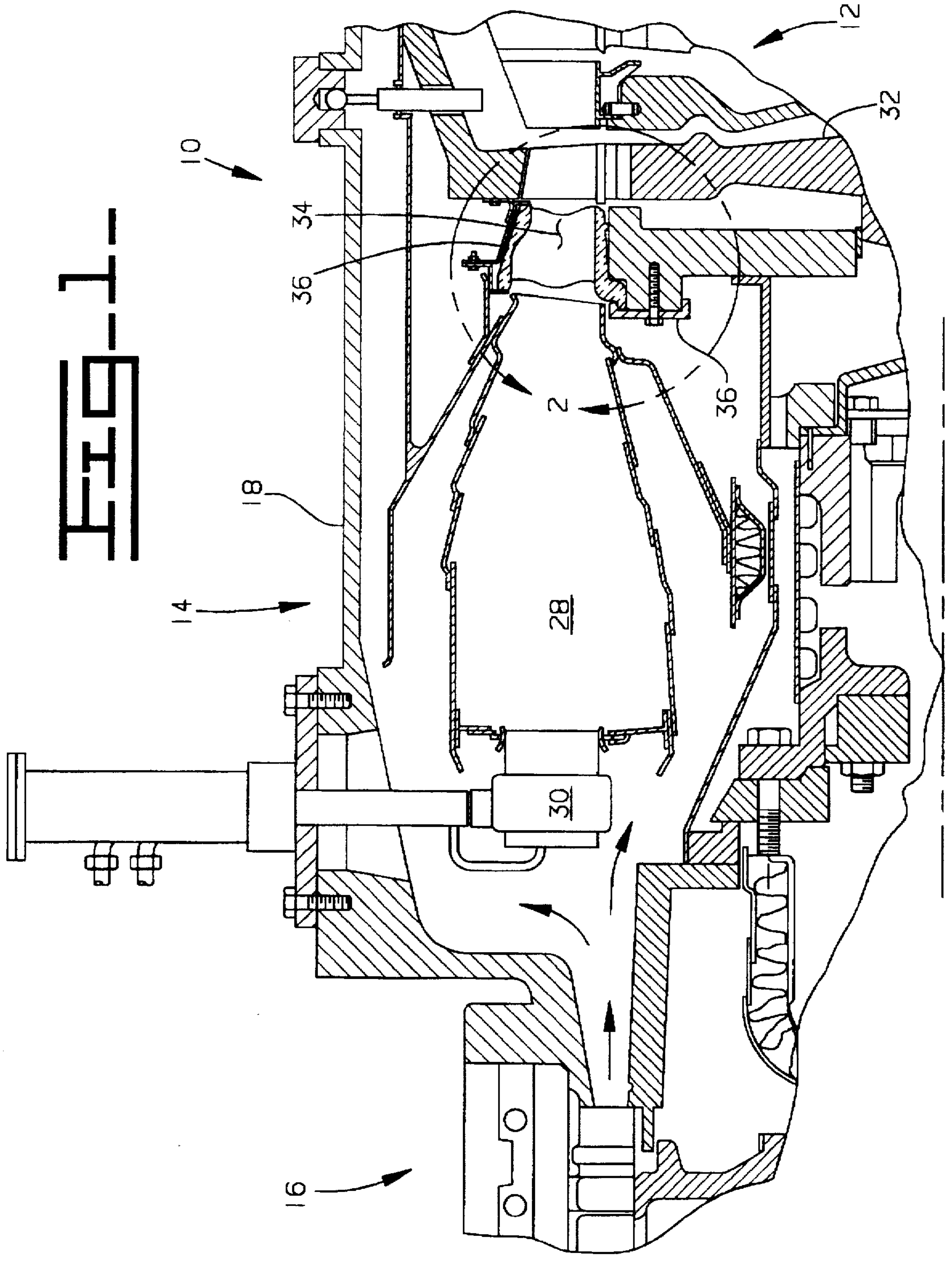
FIG. 1 is a sectional side view of a portion of a gas turbine engine embodying the present invention.
Figure 2:
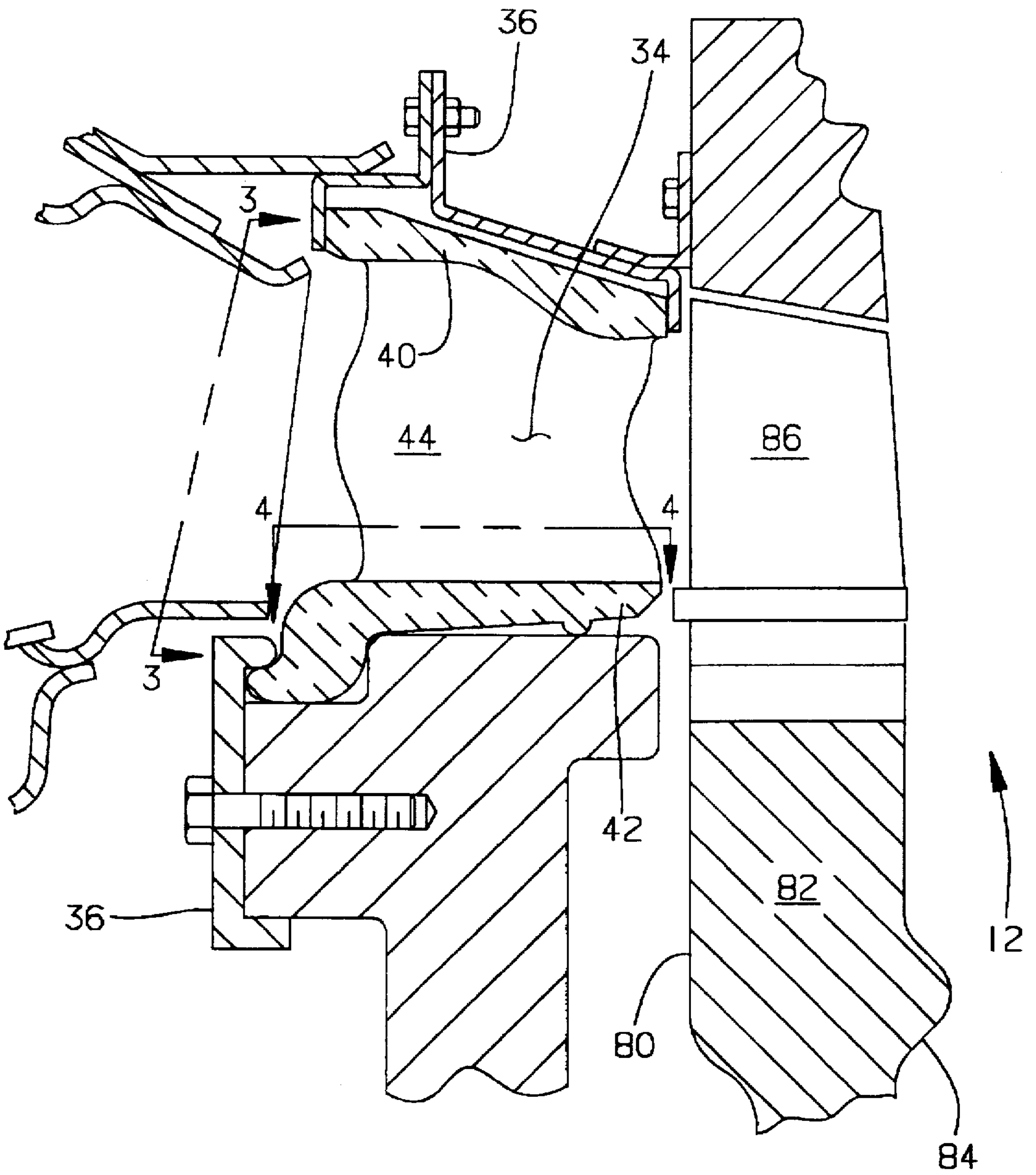
FIG. 2 is an enlarged sectional view of a portion of FIG. 1 taken along lines 2—2 of FIG. 1.

Referring to FIGS. 1 and 2, a gas turbine engine 10, not shown in its entirety, has been sectioned to show a turbine section 12, a combustor section 14 and a compressor section 16. The engine 10 includes an outer case 18 surrounding the turbine section 12, the combustor section 14 and the compressor section 16. The combustion section 14 includes a combustion chamber 28 having a plurality of fuel nozzles 30 (one shown) positioned in fuel supplying relationship to the combustion section 14 at the end of the combustion chamber 28 near the compressor section 16. The turbine section 12 includes a first stage turbine 32 disposed partially within an integral first stage nozzle and shroud assembly 34. The assembly 34 is supported within the outer case 18 in a conventional manner with the engine 10 to a mounting structure 36 having a preestablished rate of thermal expansion. The nozzle and shroud assembly 34 includes an outer annular ring member 40 being supported in a generally convention manner to the outer case 18. The nozzle and shroud assembly 34 further includes an inner annular ring structure 42 and a plurality of airfoils or vanes 44 fixedly attached thereto each or either of the outer annular ring member 40 and the inner annular ring structure 42. In this application, the outer annular ring member 40, the inner annular ring structure 42 and the plurality of airfoils 44 are made of a ceramic material and have a lower rate of thermal expansion than the mounting structure 36 and primary components of the engine 10. Furthermore, in this application, the airfoils 44 are fixedly attached to each of outer annular ring member 40 and the inner annular ring structure 42. In this application, the nozzle and shroud assembly 34 includes a plurality of segments 46, one best shown in FIG. 4, but could be a single structure without changing the essence of the invention.

Figure 3:
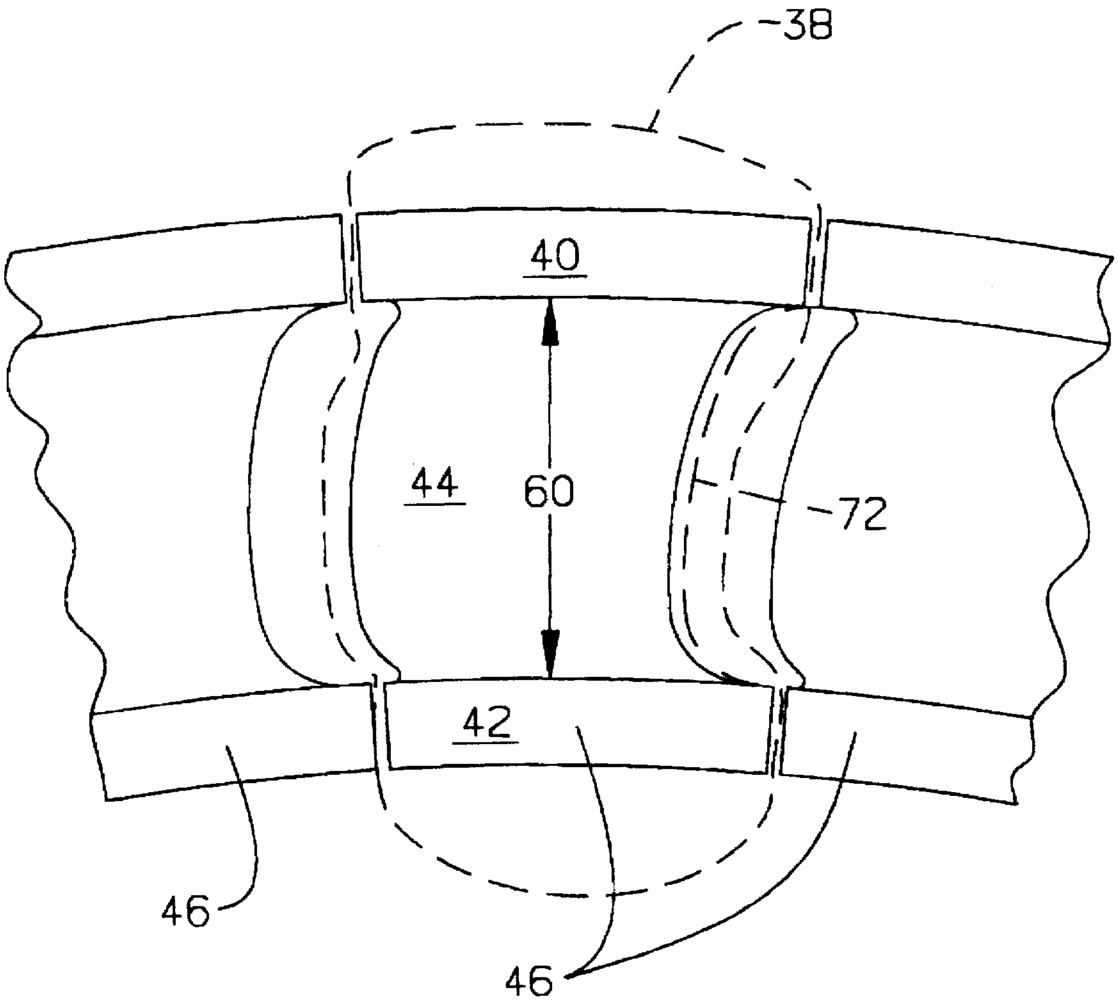
FIG. 3 is an enlarged view of an airfoil taken along lines 3—3 of FIG. 2.
Figure 4:
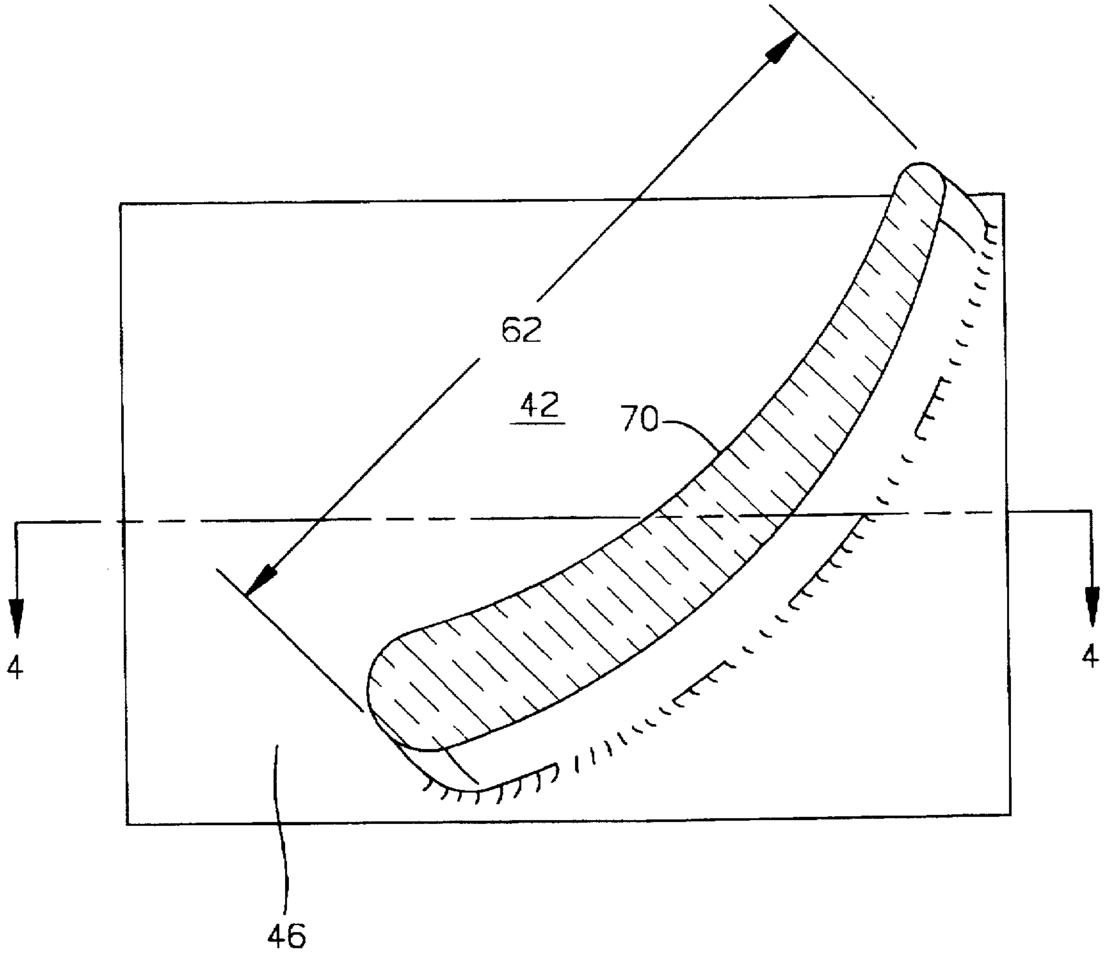
FIG. 4 is an enlarged sectional view of an airfoil along line 4 of FIG. 3.

As further shown in FIGS. 3 and 4, in this application, each of the plurality of segments 46 are formed by a casting process and have a transition portion interconnecting the airfoil 44 to each of the inner annular ring structure 42 and the outer annular ring member 40. Each of the plurality of airfoils 44 define a span 60 having a preestablished span length and a chord 62 having a preestablished chord length. The chord length is generally equal to the span length. A cross-sectional view along the radial span length is generally uniform or equal along the entire span length. An axial curvature 70, and a tangential curvature 72 are compounded such that the airfoil 44 generally forms a "C" shape when viewed parallel to the chord 62. Studies have shown that stress follows the bow magnitude, more curvature or bow 70,72 yields lower stresses. The amount of curvature or bow 70,72 chosen as a percentage of span length was 10 percent in the axial direction, and 20 percent in the tangential direction. For stress relieving purposes, the direction of the compound bow 70,72 can be either toward or away from the flow of combustion gases leaving the combustor section 14; however, for aerodynamic performance reasons the curvature or bow 70,72 was directed toward the combustor section 14.

As best shown in FIG. 2, the turbine section 12 is of a generally conventional design. For example, the first stage turbine 80 includes a rotor assembly 82 disposed axially adjacent the nozzle and shroud assembly 34. The rotor assembly 82 is comprised of a rotor or disc 84 having a plurality of turbine blades 86 positioned therein.

Figure 5A:
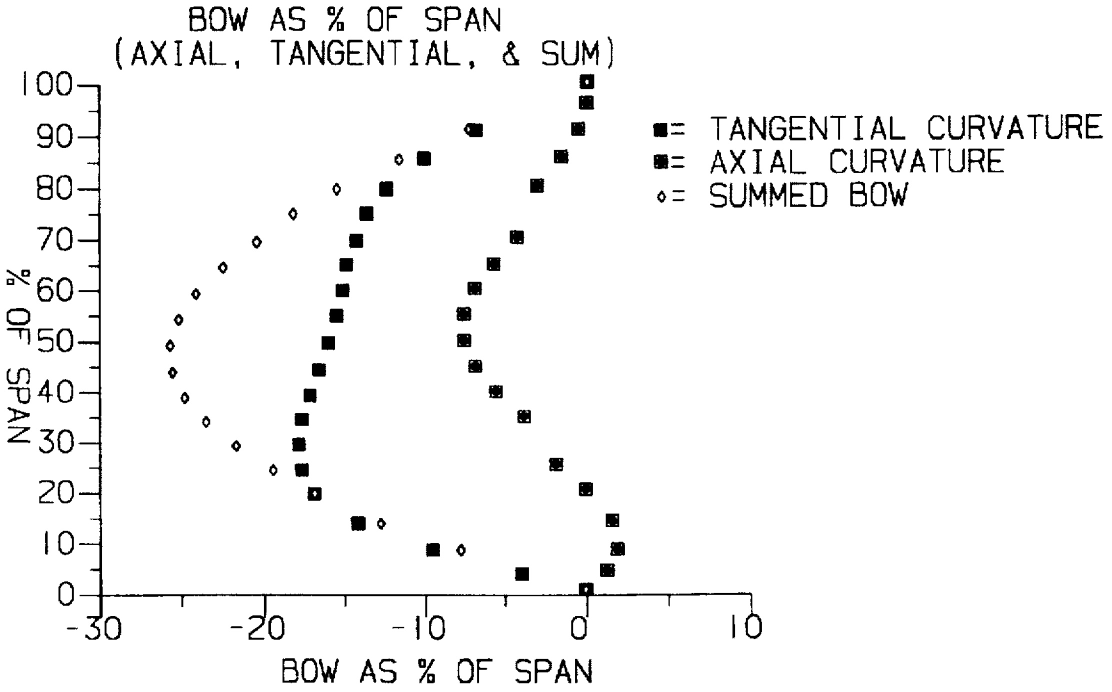
FIG. 5A is a graphic illustrating the components of an airfoil configuration which when summed form a generally "C" configuration in which the compound bow faces the combustor section.
Figure 5B:
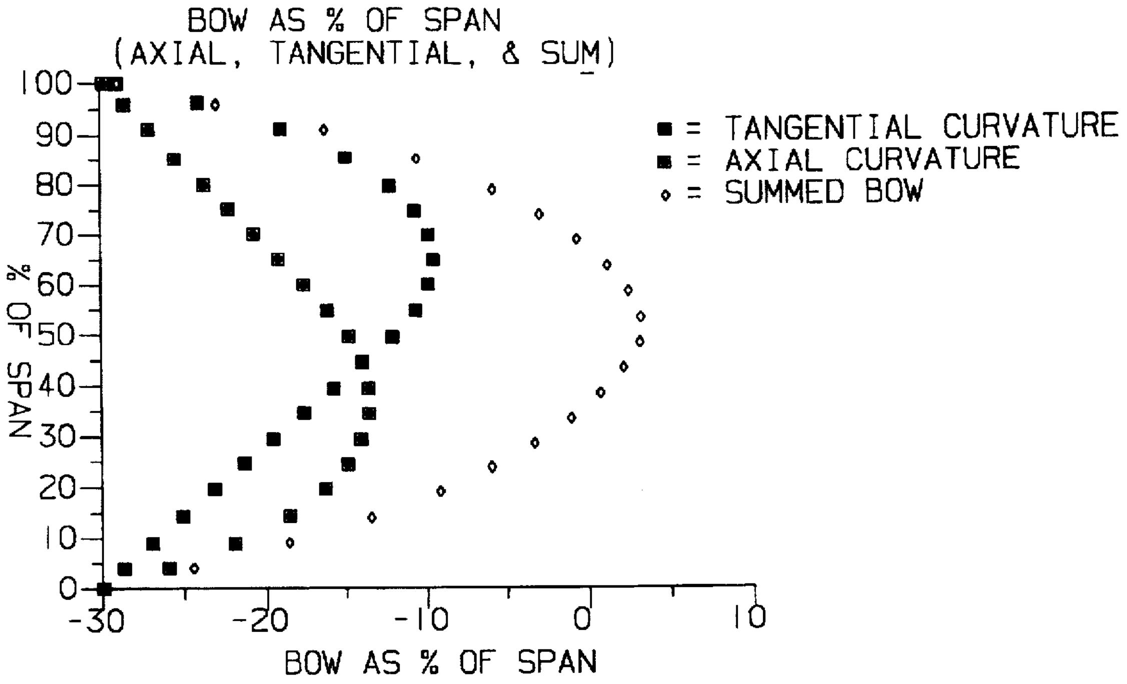
FIG. 5B is a graphic illustrating the components of an airfoil configuration which when summed form a generally "C" configuration in which the compound bow faces the turbine section.

The above description is of only the first stage nozzle and shroud assembly 34 and first stage turbine 80; however, it should be known that the construction could be generally typical of the remainder of the turbine stages within the turbine engine 10. FIGS. 5A and 5B contains graphic representation of low stress curvatures. Each of the graphs depict the generally "C" configuration defined after summing the low stress curvatures. FIG. 5A is bowed toward the combustor section 14 and FIG. 5B is bowed toward the turbine section 12. The shapes derived are not limited to nozzles as described above, but could be used to reduce stress in turbine blades and other structures subject to similar temperature gradients.

Industrial Applicability

In operation, air from the compressor section 16 is delivered to the combustor 28 of the combustor section 14. Fuel is mixed with the air and combustion occurs. The hot gases pass through the first stage nozzle and shroud assembly 34 and are directed to the first stage turbine 80. The compound bow 70,72 of the airfoil 44 increases the longevity of the segmented ceramic nozzle and shroud assembly 34 used within the gas turbine engine 10. The following operation will be directed to the first stage nozzle and shroud assembly 34; however, the functional operation of the remainder of the airfoils (blades and nozzles) could be very similar if implemented to use the compound bow 70,72. An airfoil having a generally straight configuration has been found to exhibit undesirable stress when subjected to gas flow exiting the combustor 28. The compound bow 70,72 permits the airfoil 44 to more easily flex when subjected to the temperature gradients with the gas flow path. Thus, stresses are relieved.

Thus, the primary advantages of the improved airfoil 44 configuration having a compound bow 70,72 is two-foil. The configuration enables the airfoil to be made of a material, such as ceramic, having a relative low resistance to internal thermal stresses and a relative high resistance to temperatures. Thus, the airfoil 44 can be used to increase efficiency of the gas turbine engine by using higher temperature combustion gases. The configuration further increases the longevity of the air foil 44 by reducing internal thermal stress, reducing down time and maintenance.

Other aspects, objects and advantages of this invention can be obtained from a study of the drawings, the disclosure and the appended claims.

We claim:

1. An airfoil defining a chord having a preestablished chord length and a span having a preestablished radial span length, each of said chord and said span having a curvature which when summed, forms a generally "C" configuration defining a compound bow including an axial bow and a tangential bow and said tangential bow being about 20 percent of the preestablished radial span length.

2. The airfoil of claim 1 wherein said chord length and said span length are equal.

3. The airfoil of claim 2, wherein said axial bow is about 10 percent of the preestablished radial span length.

4. An airfoil defining a chord having a preestablished chord length and a span having a preestablished radial span length, each of said chord and said span having a curvature which when summed, forms a generally "C" configuration defining a compound bow including an axial bow and a tangential bow and said tangential bow being about twice the axial bow.

5. A gas turbine engine having a compressor section, a combustor section and a turbine section, comprising:

said turbine section including a nozzle and shroud assembly being supported within the engine to a mounting structure having a preestablished rate of thermal expansion;

said nozzle and shroud assembly having a preestablished rate of thermal expansion being less than that of the mounting structure;

said nozzle and shroud assembly including an inner annular ring member, an outer annular ring structure and a plurality of airfoils being positioned therebetween; and said plurality of airfoil defining a chord having a preestablished chord length and a span having a preestablished radial span length, each of said chord and said span defining a curvature which when summed forms a generally "C" configuration defining a compound bow including an axial bow and a tangential bow and said tangential bow is about 20 percent of the preestablished radial span length.

6. The gas turbine engine of claim 5, wherein said axial bow is directed toward the combustor section.

7. The gas turbine engine of claim 5, wherein said axial bow is about 10 percent of the preestablished span length.

8. The gas turbine engine of claim 5 wherein said plurality of airfoils are fixedly positioned between the inner annular ring member and the outer annular ring structure.

9. The gas turbine engine of claim 5 wherein said nozzle and shroud assembly includes a plurality of segments.

10. A gas turbine engine having a compressor section, a combustor section and a turbine section, comprising:

said turbine section including a nozzle and shroud assembly being supported within the engine to a mounting structure having a preestablished rate of thermal expansion;

said nozzle and shroud assembly having a preestablished rate of thermal expansion being less than that of the mounting structure;

said nozzle and shroud assembly including an inner annular ring member, an outer annular ring structure and a plurality of airfoils being positioned therebetween; and said plurality of airfoils defining a chord having a preestablished chord length and a span having a preestablished radial span length, each of said chord and said span defining a curvature which when summed forms a generally "C" configuration defining a compound bow including an axial bow and a tangential bow and said tangential bow is about twice the axial bow.

11. The gas turbine engine of claim 6 wherein said plurality of airfoils are fixedly positioned between the inner annular ring member and the outer annular ring structure.

12. The gas turbine engine of claim 6 wherein said nozzle and shroud assembly includes a plurality of segments.

* * * * *

UNITED STATES PATENT AND TRADEMARK OFFICE

CERTIFICATE OF CORRECTION

PATENT NO. : 5,706,647

DATED : January 13, 1998

INVENTOR(S) : Gary A. Frey (deceased), and Christopher Z. Twardochleb

It is certified that error appears in the above-identified patent and that said Letters Patent is hereby corrected as shown below:

Please correct the description as follows:

COLUMN 1, line 5: the contract number needs to read DE-AC02-92CE40960 instead of DE-AC21-93MC30246.

Signed and Sealed this

Twentieth Day of October, 1998

Attest:

Bruce Lehman

BRUCE LEHMAN

*Attesting Officer* *Commissioner of Patents and Trademarks*